(12) United States Patent
Kanno et al.

(10) Patent No.: US 6,715,025 B2
(45) Date of Patent: Mar. 30, 2004

(54) INFORMATION PROCESSING APPARATUS USING INDEX AND TAG ADDRESSES FOR CACHE

(75) Inventors: Yusuke Kanno, Hachioji (JP); Hiroyuki Mizuno, Kokubunji (JP); Takao Watanabe, Fucyu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/186,891

(22) Filed: Jul. 2, 2002

(65) Prior Publication Data

US 2002/0169920 A1 Nov. 14, 2002

Related U.S. Application Data

(63) Continuation of application No. 09/495,954, filed on Feb. 2, 2000, now Pat. No. 6,438,641.

(30) Foreign Application Priority Data

Feb. 18, 1999 (JP) .......................................... 11-039746

(51) Int. Cl.[7] .............................................. G06F 13/00
(52) U.S. Cl. ............................ 711/5; 710/305; 711/105
(58) Field of Search ........................... 711/5, 202, 105; 710/305

(56) References Cited

U.S. PATENT DOCUMENTS

| 4,370,732 | A | | 1/1983 | Kogge |
| 4,918,600 | A | | 4/1990 | Harper, III et al. |
| 5,574,876 | A | * | 11/1996 | Uchiyama et al. .............. 711/5 |
| 5,999,474 | A | * | 12/1999 | Leung et al. ................ 365/222 |
| 6,381,671 | B1 | * | 4/2002 | Ayukawa et al. ........... 711/104 |

OTHER PUBLICATIONS

Conference Proceedings of the 13th Annual International Symposium on Computer Architecture, Jun. 1986, D.T. Harper, III et al, pp. 324–328,.
Proceedings of the 1987 International Conference on Parallel Processing, A. Norton et al, pp. 247–254, A Class of Boolean Linear Transformations for Conflict–Free Power–of–Two Stride Access.
Nikkei Microdevices, Feb. 1998, pp. 134–141.
"Computer Architecture A Quantitative Approach", Second Edition. D.A. Patterson et al, 1996, pp. 375–390.
Proceedings of the 1985 International Conference on Parallel Processing, pp. 276–283, XOR–Schemes: A Flexible Data Organization in Parallel Memories, Frailong et al.

* cited by examiner

*Primary Examiner*—David L. Robertson
(74) *Attorney, Agent, or Firm*—Mattingly, Stanger & Malur, P.C.

(57) ABSTRACT

In an information processing apparatus involving a cache accessed by INDEX and TAG addresses, accesses to the main memory include many accesses attributable to the local character of referencing and write-back accesses attributable to the replacement of cache contents. Accordingly, high speed accessing requires efficient assignment of the two kinds of accesses to banks of the DRAM. In assigning request addresses from the CPU to different banks of the DRAM, bank addresses of the DRAM are generated by operation of the INDEX field and the TAG field so that local accesses whose INDEX varies and accesses at the time of writing back of which INDEX remains the same but TAG differs can be assigned to different banks, thereby enabling high speed accessing. Furthermore, as reading and writing at the time of writing back can be assigned to a separate bank, pseudo dual-port accessing is made possible with only one port, resulting in higher speed write-back accessing.

19 Claims, 11 Drawing Sheets

NUMBER OF SA = 256
NUMBER OF BL = 256
NUMBER OF WL = 8
NUMBER OF GBL = 128
DEGENERACY = 2
NUMBER OF BANK = 2

NUMBER OF SA = 256
NUMBER OF BL = 256
NUMBER OF WL = 4
NUMBER OF GBL = 128
DEGENERACY = 2

FIG. 10A
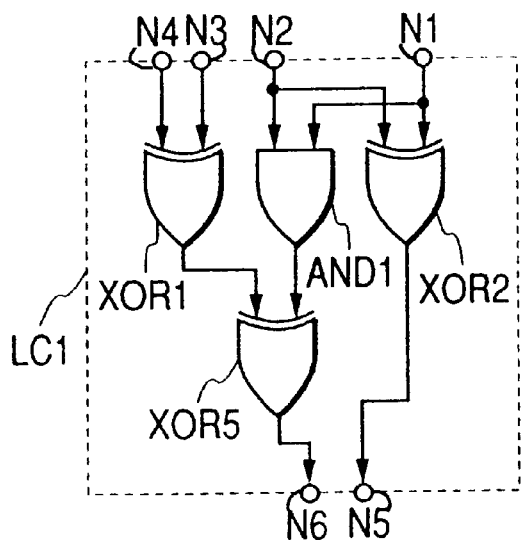
FIG. 10B
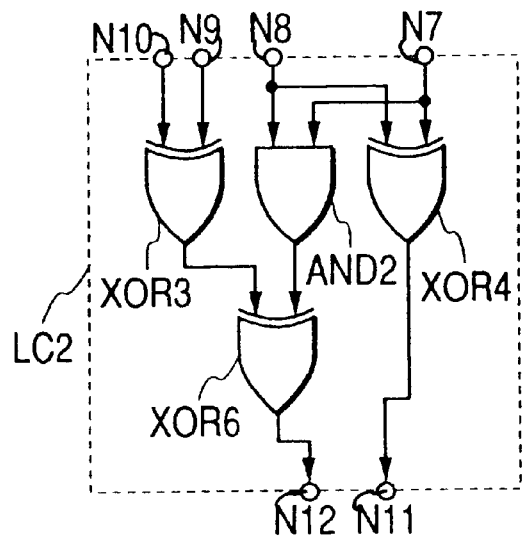
FIG. 11A
| D-TAG | | | | |
|---|---|---|---|---|
| 11 | 3 | 2 | 1 | 0 |
| 10 | 2 | 3 | 0 | 1 |
| 01 | 1 | 0 | 3 | 2 |
| 00 | 0 | 1 | 2 | 3 |
| | 00 | 01 | 10 | 11 |
D-INDEX
FIG. 11B
| D-TAG | | | | |
|---|---|---|---|---|
| 11 | 3 | 0 | 1 | 2 |
| 10 | 2 | 3 | 0 | 1 |
| 01 | 1 | 2 | 3 | 0 |
| 00 | 0 | 1 | 2 | 3 |
| | 00 | 01 | 10 | 11 |
D-INDEX

INFORMATION PROCESSING APPARATUS USING INDEX AND TAG ADDRESSES FOR CACHE

This application is a continuation of application Ser. No. 09/495,954 filed Feb. 2, 2000 now U.S. Pat. No. 6,438,641.

FIELD OF THE INVENTION

The present invention relates to an information processing system including a CPU and memories, and more particularly addressing the main memory where a cache is used.

BACKGROUND OF THE INVENTION

References cited herein are listed below, and they will be referred to hereinafter by the respective reference numbers. Reference 1 (Ref. 1) corresponds to the following article: Nikkei Microdevices, February 1998, pp. 134–141 (in Japanese), and Reference 2 (Ref. 2) corresponds to the following article: David A. Patterson and John L. Hennessy, Computer Architecture, A Quantitative Approach, Second Edition, Morgan Kaufmann Publisher Inc., (1996), pp. 375–384.

Reference 1 discloses an example of address mapping in a DRAM on p. 141. In this example, two chips of four-bank 64-Mbit DRAMs are used. If, in this example, accesses to 64-bit consecutive addresses are assigned in the order of column, row, device and bank from the lowest position upward as illustrated in FIG. C(a) of that reference, 16-MB data can be stored continuously on the two memory banks of the first chip and the second chip. FIG. C(b) of the same reference illustrates an instance in which the assignment is made in the order of column, bank, device and row from the lowest position upward. It is stated that this assignment results in the storage of data to distribute accesses among the eight banks.

Before filing this application, the present applicant studied address mapping which would take account of relationships between a central processing unit (CPU), a cache and a main memory constituting an actual information processing system. As a result, it is found that address conversion (address mapping) should be determined by taking account of the relationship between the cache and the main memory. This is because the addresses issued by the CPU are transferred to the main memory when required data are not found in the cache.

FIG. 2 is a diagram illustrating address management by the cache, which was studied before filing this application. In this diagram, which is cited from p. 378 of (Ref. 2), a physical address is divided into areas for management by the cache. The cache broadly divides each physical address into two areas, a block offset and a block address. The block address is an address for each block offset. Some caches, known as direct-mapped caches and set-associative caches, use a management system under which a block address is further divided into a trailing part known as an index and a leading part known as a tag.

FIG. 3, cited from p. 381 of reference 2, illustrates how the cache manages addresses and data. Herein, "CM" stands for cache, in this case a direct-mapped cache of which the capacity is 8 KB and the block offset is 32 B. Numbers 1–4 with a circle in FIG. 3 will be denoted by numbers 1–4 with ( ) and * in this specification, for example (*1) is for 1 with a circle. First will be described a case in which, in a request access from the CPU to the memory system, a read access has hit the cache. A request address from the CPU is transmitted to the cache via address lines ((*1) in FIG. 3). After that, on the basis of index information, which is part of the request address, the number by which it is entered in the cache is determined. Since a direct-mapped cache is taken up as an example here, the total number of index addresses (in this case 2 to the eighth power, or 256) is identical with the number of entries in the cache. Accordingly, the matching in this case is determined by one-to-one correspondence ((*2) in FIG. 3). After an entry number in the cache is selected on the basis of index information of the address, the tag stored in the entry indicated by that entry number is compared with the tag of the request address ((*3) in FIG. 3). This is accomplished only when the entry in the cache is valid (confirmed by "valid" indicating a valid bit). If the tag of the request address and the tag entered in the cache are found identical, the address of the block offset will be utilized to transmit desired 8-byte data to the CPU by a 4:1 multiplexer ((*4) in FIG. 3). Or, on the contrary, if the request address and the address of the data held by the cache are not identical, the main memory will be accessed.

Next will be described how writing into the memory system is accomplished. The description here will refer to a case in which a write access hits a cache of a write-back type (to be explained below). When a write request is generated by the CPU, the request address is communicated to the cache as in the aforementioned case of read access. After that, the above-described procedure is taken to judge whether or not the request address is identical with the address of any of the data held by the cache. Hereupon, if the tag of the request address is found identical with any tag held by the cache, the pertinent data held by the cache are altered, and a dirty bit (not shown) indicating nonidentity with any data in the main memory is set. As the CPU has only to update the contents of the cache and can continue processing, high speed accessing is made possible.

Now will be described a case in which, the contents of the cache having varied in this way, the next access is a cache miss. In this case, the contents of the cache should be replaced with newly requested contents. This is because of the utilization of the corollary of locality (ie., recently written contents are more likely to be used again). Whereas the old contents of the cache are written back into the main memory, this replacement of the contents of the cache is known as write back, and cache memories of this type are called write-back type cache memories. Since the cache manages data by the index section, which is a part of an address, the address replaced here has the same index section as the request address and differs in the tag section (the block offset is wholly replaced, and this is known as cache replacement).

Considering such operations of the cache, in accessing the main memory, two instances should be taken into account, i.e. accessing which utilizes the corollary of locality and accessing an address with the same index but a different tag in a writing-back operation. In the case of reference 1, while accessing in the first instance dependent on the corollary of locality can be accomplished at high speed because the access is diverted to a different bank, but no consideration is given to accessing according to the second instance, i.e. accessing at the time of writing back. Thus once access to a different word line on the same bank is necessitated by writing back (bank conflict), high speed accessing is made difficult. Consequently, this creates a problem in executing an application (program) involving frequent writing back.

SUMMARY OF THE INVENTION

An object of the present invention, therefore, is to avoid bank conflicts, where a DRAM is to be used as the main memory of an information processing apparatus having a cache, by utilizing both accessing according to the corollary of locality and accessing at the time of writing back and directing these accesses to different banks of the DRAM with a high probability. Another object of the invention is to increase the speed of accessing immediately following write-back processing.

A typical procedure according to the invention is as follows. When assigning request addresses from a CPU to different banks of a DRAM, bank addresses in the DRAM are generated by operation on the index section and the tag section of each bank address so that local accesses and write-back accesses can be assigned to different banks. More specifically, there is provided an address mapping circuit for generating bank addresses in the DRAM by performing operation on the index section and the tag section of each request address issued by the CPU. A typical operation for generating the index section and the tag section is addition.

BRIEF DESCRIPTION OF THE DRAWINGS

FIGS. 10A and 10B illustrate the logic circuits of FIG. 9.

FIGS. 11A and 11B illustrate the result of bank address conversion by exclusive OR operation (A) and addition (B).

DETAILED DESCRIPTION OF THE PREFERRED EMBODIMENTS

Embodiment 1

Figure 1:
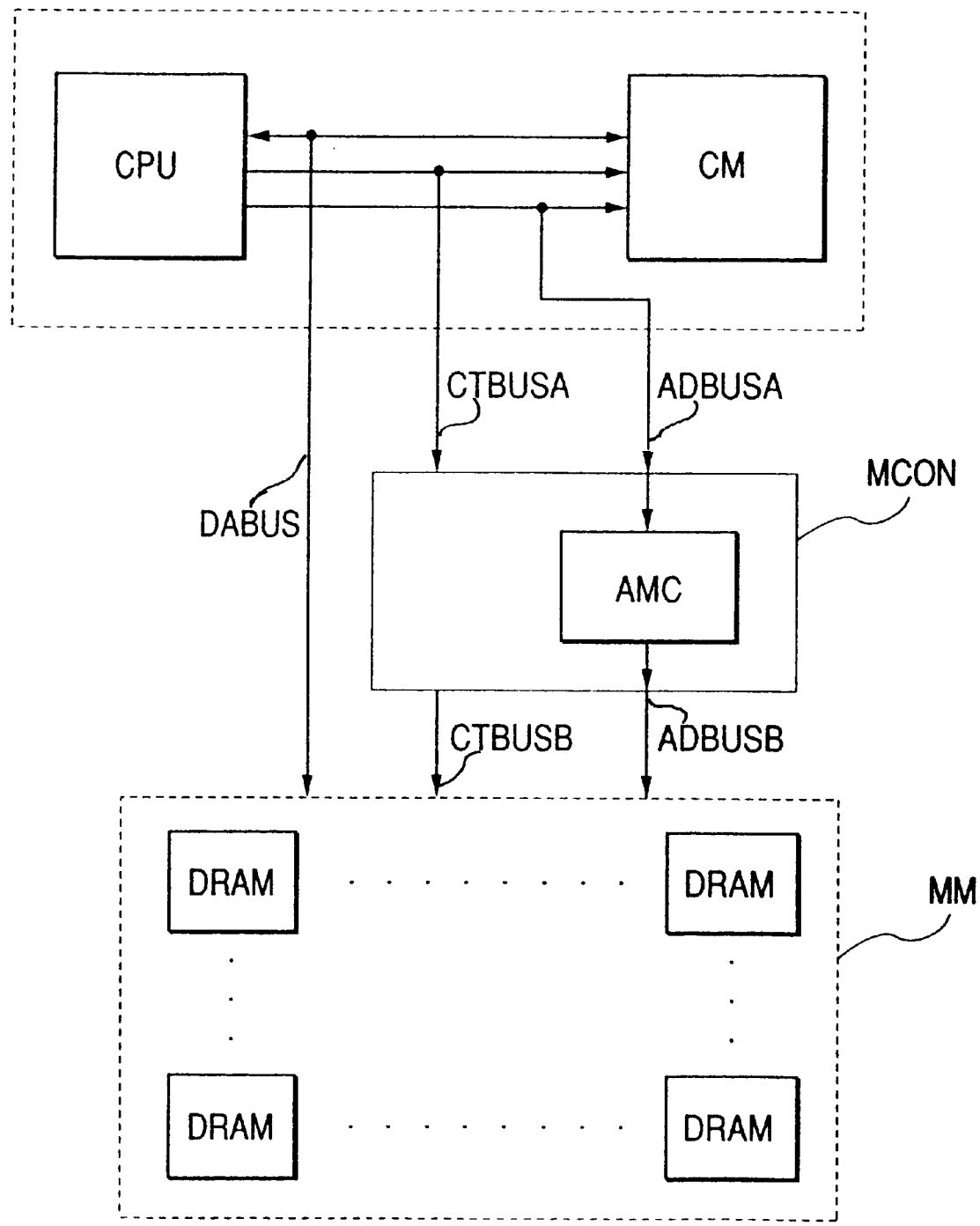
FIG. 1 is a diagram illustrating an information processing apparatus according to a first preferred embodiment of the present invention.
Figure 2:
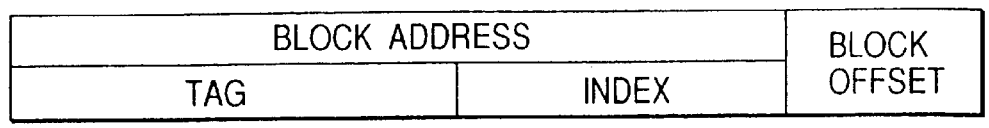
FIG. 2 illustrates address management by a cache.
Figure 3:
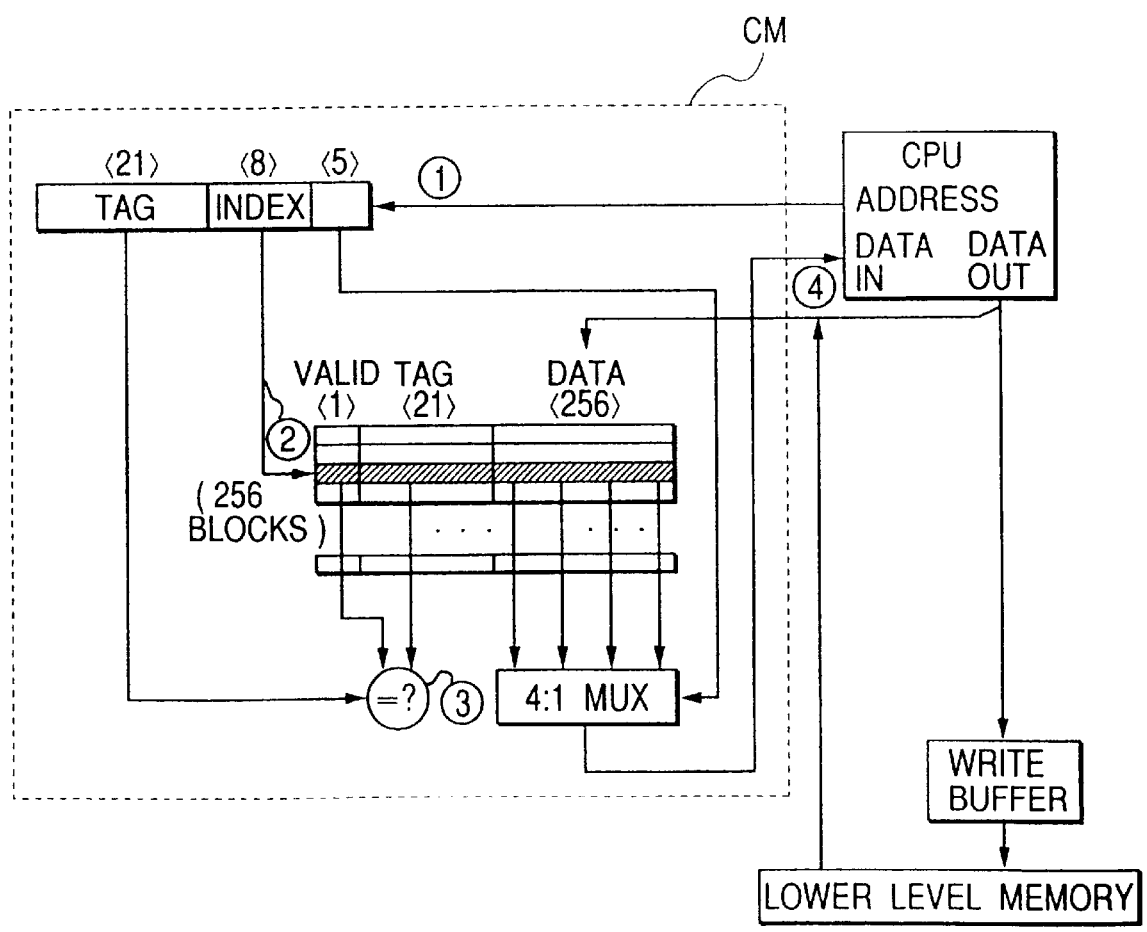
FIG. 3 illustrates an example of configuration of an information processing apparatus involving a cache.

FIG. 1 is a configurational diagram illustrating the basic concept of the information processing apparatus pertaining to this patent application. This apparatus consists of a cache CM, a CPU, a memory controller MCON involving an address mapping circuit AMC, and a main memory MM comprising one or more DRAMs. A request address from the CPU is communicated to ADBUSA, the CM and the MCON. The request communicated to the CM, after being converted by the AMC into a bank address, a row address and a column address for accessing the DRAM, communicated via ADBUSB to the MM. The description here will refer to a small-scale system for the convenience of explaining address conversion. Accordingly, in the following description, a direct-mapped cache of 128 B (in the following description "B" immediately following a numeral denotes "bytes") in capacity having a block offset of 4 bits (16 B). In this example the index consists of 3 bits, and the tag, 23 bits.

Figure 4:
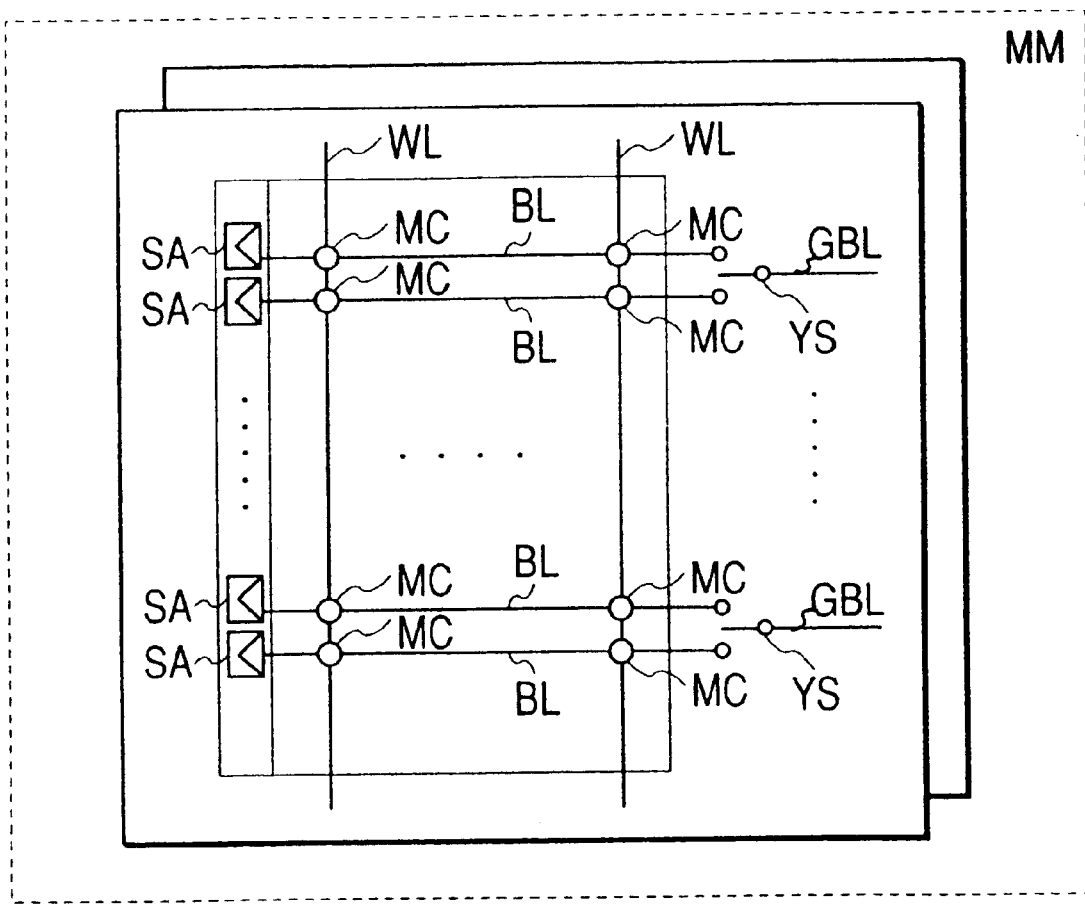
FIG. 4 illustrates an example of configuration of a main memory MM for use in the embodiment of FIG. 1.

FIG. 4 illustrates an example of configuration of the main memory MM for use in the invention. Here a DRAM of 512 B in capacity (for an address, 9 bits are needed) consisting of two banks (for an address, 1 bit is needed) is supposed to constitute the MM. Here, the basic memory array has a plurality of dynamic type memory cells MCs (each having one transfer MOSFET and one capacitor) provided at the intersections of a plurality each of word lines WLs and bit lines BLs, and a sense amplifier SA has a function to amplify data in the memory cell selected by WLs. Data amplified by the SA are held on BLs, connected by a change-over switch YS to a global bit line GBL, and communicated to the CPU.

Figures 5, 6:
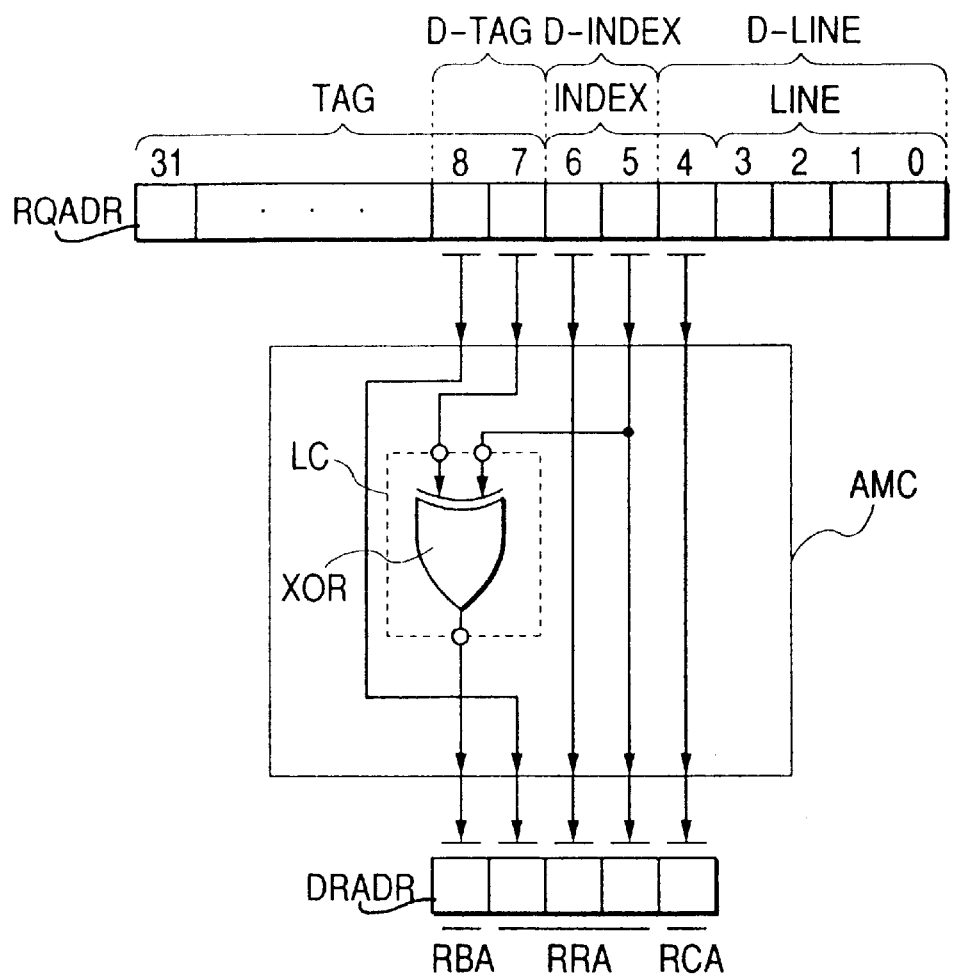
FIG. 5 illustrates an example of an address mapping circuit AMC for use in the embodiment of FIG. 1.
FIG. 6 illustrates the result of bank address conversion by the address mapping circuit of FIG. 5.

FIG. 5 illustrates one example of address conversion. Here is described how a request address RQADR is converted by the address mapping circuit AMC into a DRAM accessing address DRADR. The AMC involves a logic circuit LC. The numerals written over the illustration of the request address RQADR denote position numbers counted from the least significant bit of the bits constituting the address. LINE denotes the block offset of the cache. Hereupon, for the sake of subsequent convenience, another way of assignment for this address will be defined, with the DRAM capacity taken into consideration. D-LINE is defined to be a block offset in the units of word lines of the DRAM; D-TAG is defined to refer to addresses from the least significant bit of TAG to the DRAM capacity, and D-INDEX is defined to be part of INDEX consisting of as many bits as D-TAG. In this example, addresses from the lowest position to that of INDEX are assigned for D-LINE. As assignment is accomplished so as to cause as many consecutive addresses as possible to concentrate on the same word line, high speed accessing is possible by using a high speed page mode or the like. In some cases, it is also possible to compose D-LINE of the higher-order digits of LINE and of INDEX. Such an example, wherein consecutive addresses are assigned to different word lines, is useful where a pre-charging signal is added every time the DRAM is accessed.

Next will be described addresses to be converted by the AMC. Here is considered a case in which accesses attributable to the local character of referencing (local accesses) are concentrated on the same word line, and local accesses which cannot be concentrated on the same word line and accesses at the time of writing back are assigned to a different bank. The rationale is that the DRAM permits high speed accesses to data on the same word line except the first accessing and data, if not on the same word line, high speed accesses to data on word lines of different banks by causing the banks to operate independent of each other. Therefore, addresses which are converted here are D-INDEX and D-TAG. An address conversion system whereby these accesses are assigned to different banks wherever practicable is realized by performing exclusive OR operation on part of D-INDEX and part of D-TAG. Here, with the presence of two banks in the DRAM being taken into consideration, the result of exclusive OR operation on the lower-order digit each of D-INDEX and of D-TAG is assigned to the bank address RBA of the DRAM, a higher-order digit of D-TAG and the two bits of D-INDEX are assigned to the row address RRA, and a higher-order digit of D-LINE is assigned to the column address RCA. For carrying out such a conversion, an exclusive OR circuit is not the only available logic circuit, but the same result can as well be achieved by using, for instance, an adder. Where an adder is used, the bank address of the DRAM can be converted by BANK=(D-TAG+D-INDEX) mod N (where N is the number of banks)

This is realized by using an adder which ignores the overflow of carry. While the result of exclusive OR operation and of addition are identical where the number of banks is two, the results of conversion would differ in other cases.

FIG. 6 illustrates the result of such address conversion and bank address assignment. The horizontal axis represents a lower-order digit of D-INDEX (in binary representation), and the vertical axis a lower-order digit of D-TAG (in binary representation). The numeral in each box of the diagram is a bank address. Mapping according to the present invention makes possible assignment to different banks both part of consecutive accesses which vary only in D-INDEX and part of accesses at the time of writing back which share the same index but differ in tag. Since both accesses having a spatial locality and accesses at the time of writing back are assigned to different banks at a high probability, high speed accessing is made possible.

Embodiment 2

As stated above, addresses sharing the same index but differing in tag can be assigned to different banks of a DRAM at a high probability without allowing for a bank conflict to arise. As reading and writing at the time of writing back can be assigned to entirely separate banks by extending this address assignment, it is made possible to perform read accessing and write accessing at the time of writing back in the same cycle. An embodiment of this principle will be described below.

Figure 7:
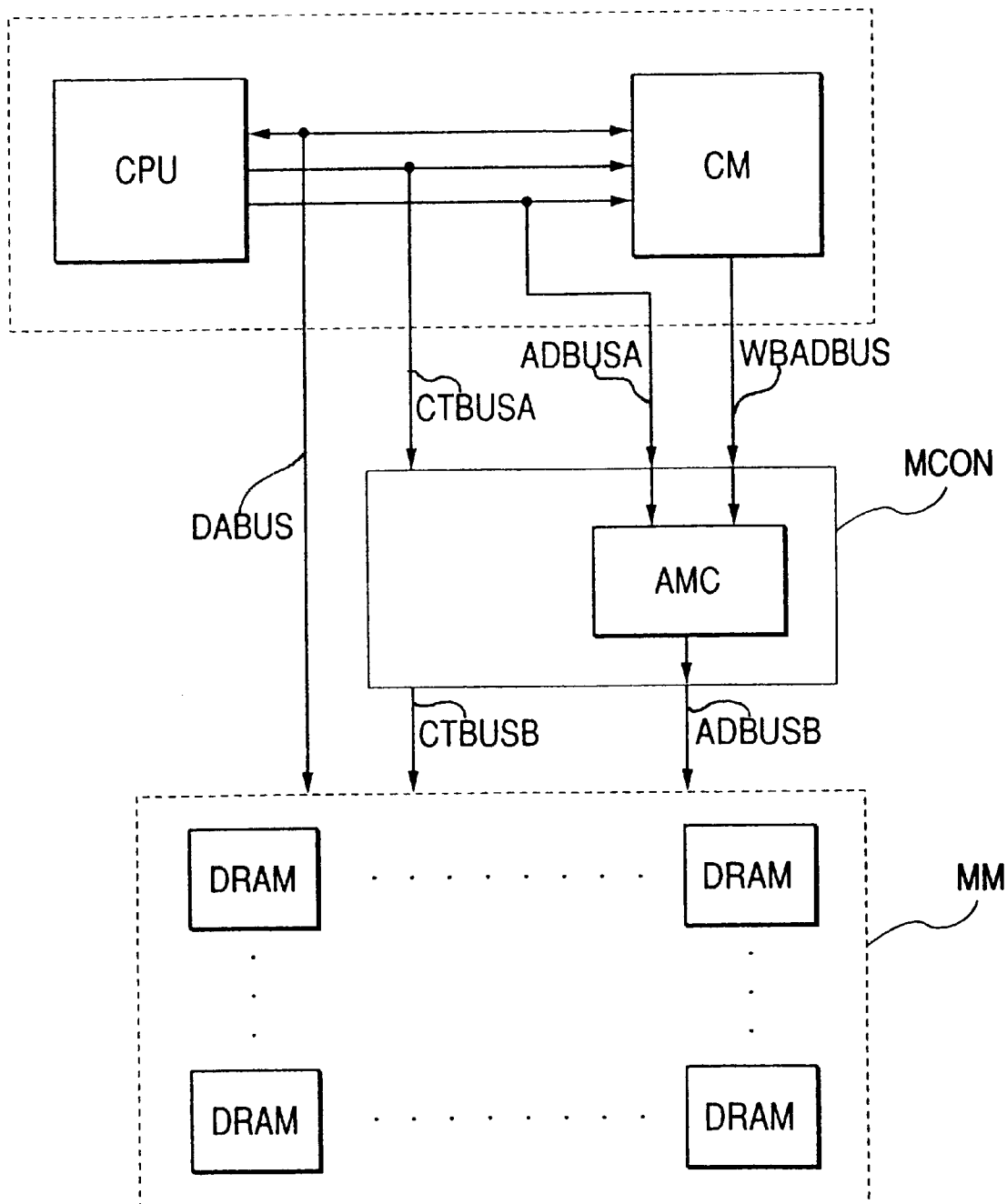
FIG. 7 is a diagram illustrating an information processing apparatus according to a second preferred embodiment of the invention.

FIG. 7 illustrates another preferred embodiment of the invention according to which, read accessing and write accessing at the time of writing back (accesses giving rise to replacement of cached contents when a cache is missed) are assigned to completely separate banks and thereby reading and writing at the time of writing back are accomplished at the same time. This embodiment consists of a CPU, a cache CM, a main memory MM involving a DRAM, a memory controller MCON for controlling the MM, and an address mapping circuit AMC contained in the MCON.

A request address from the CPU is communicated to the CM via address lines, and also communicated to the MCON. The request address communicated to the MCON is further communicated to the AMC, and converted into a bank address RBA, a row address RRA and a column address RCA of the DRAM. The TAG of the write address at the time of writing back is communicated from the CM to the MCON via write-back address line (or a write-back address bus) WBADBUS, and converted by the AMC into a write bank address WBA for use at the time of writing back to the DRAM. These addresses converted by the AMC are communicated to the MM via an address line B (or an address bus) ADBUSB. This ADBUSB, to be detailed afterwards, consists of address lines RBAL for communicating the bank address RBA of the request address, address line WBAL for communicating the bank address WBA of the write address at the time of writing back, and address line RCL for communicating the row address RRA and the column address RCA. Control of the CM and the MCON from the CPU is accomplished via control line A (or a control signal bus A) CTBUSA. Control of the MM from the MCON is accomplished via control lines B (or a control signal bus B) CTBUSB. Data exchanging between the CPU and a memory system consisting of the CM and the MM is accomplished via a data line (or a data bus) DABUS.

Figure 8A:
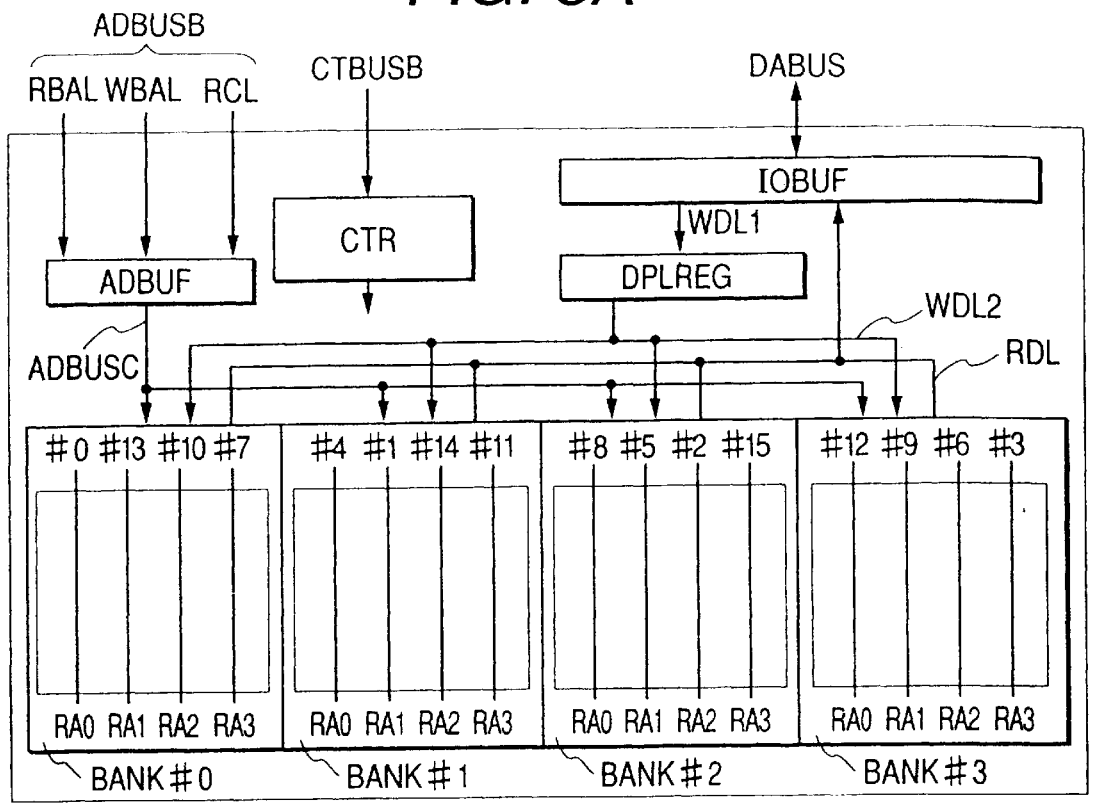
FIGS. 8A and 8B illustrate an example of a configuration of a main memory MM for use in the embodiment of FIG. 7.

FIG. 8A illustrates an example of configuration of the main memory. The CM considered here is supposed to be a direct-mapped cache of which the capacity is 128 B and the block offset (LINE) is 4 bits (16 B), and the MM is supposed to have a capacity of 512 B (for an address, 9 bits are needed). In this case, as D-TAG consists of 2 bits, in order to assign accesses sharing the same INDEX and differing in TAG to different banks, the following number of banks will suffice.

Number of banks=2 to the D-TAG power=$2^2$=4

Each bank consists of 4 word lines denoted by signs from RA0 to RA3. This configuration of the DRAM is characterized by the assignment of read accesses and write accesses at the time of writing back to completely separate banks. Incidentally, the numerals written over the word lines represent the addresses of D-INDEX and D-TAG parts when the bank addresses are converted by additions to be explained below.

Hereupon, operations of different parts will be described. Addresses of DRAM accesses entered via the ADBUSB consisting of RBAL, WBAL and RCL are received an address buffer ADBUF, and then communicated to different banks via the ADBUSC. A control signal entered via the CTBUSB, after being entered into a control section CTR, controls different parts within the DRAM from the CTR. Data inputting/outputting to and from the DRAM is accomplished via data lines (or a data bus) DABUS, and connected to an I/O buffer IOBUF in the DRAM. This embodiment, wherein reading and writing at the time of writing back are performed at the same time, is characterized by the use of the same number of lines constituting the data bus DABUS as according to the prior art. Therefore, this DABUS is used for both reading and writing. Furthermore, for simultaneous reading and writing at the time of writing back, the communication paths of read and write data within the DRAM are made independent of each other according to the invention. First, read data are directly communicated from each bank to this IOBUF via read data lines RDL, while write data, after being communicated from the IOBUF to a data pre-loading register DPLREG via rite data lines WDL1, are communicated to each bank via write data lines WDL2. Thus, by installing the DPLREG, pseudo dual-port accessing is made is possible with only one port as will be described in detail below.

Figure 8B:
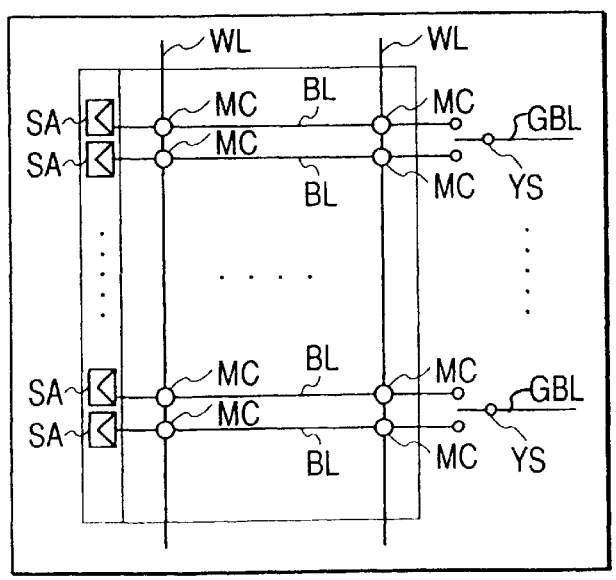

FIG. 8B illustrates the configuration of one bank in the DRAM structured in this way. Signs have respectively the same meanings as the corresponding ones in FIG. 4, and only the number of units each of them refers to is different.

Figure 9:
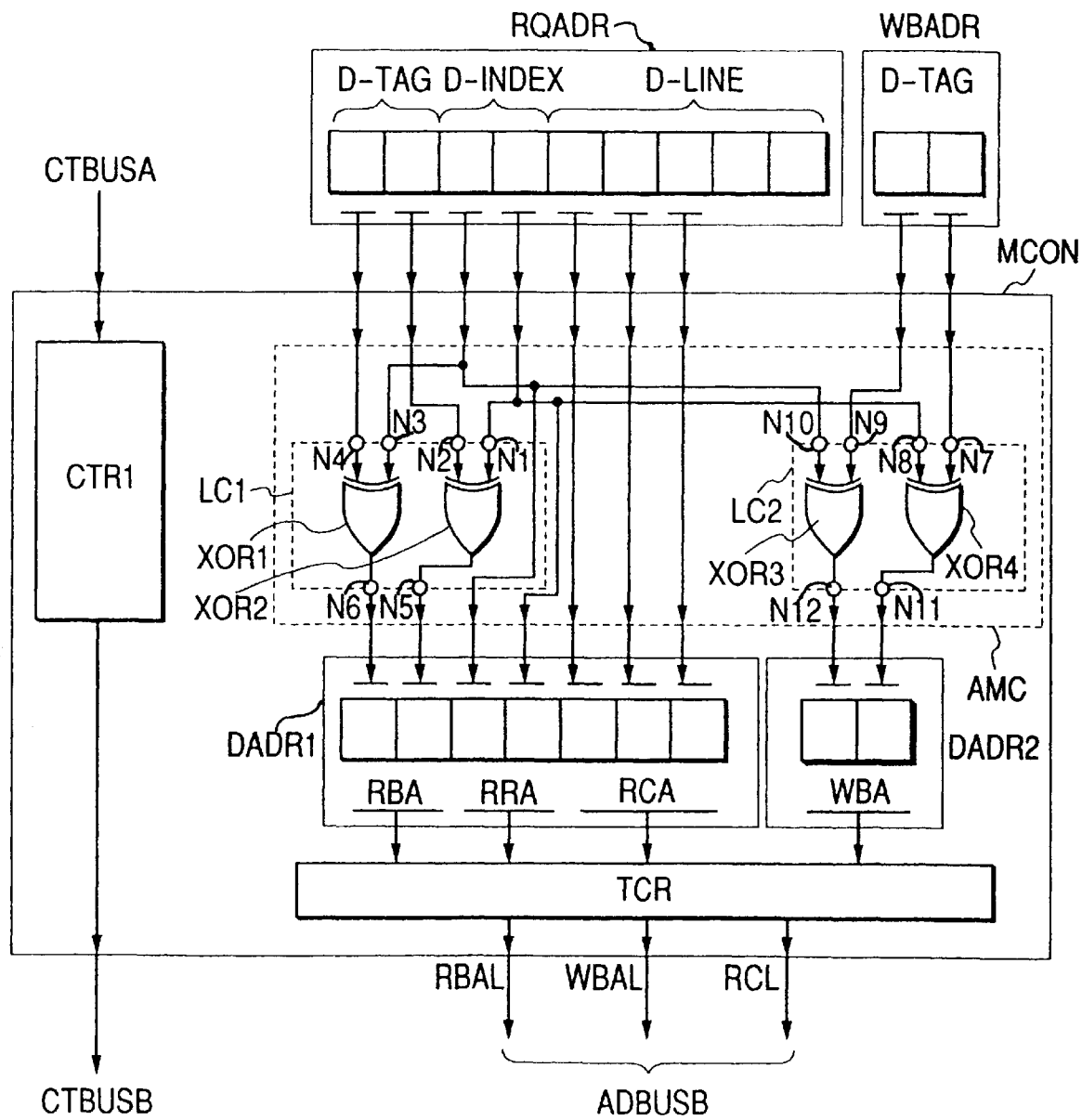
FIG. 9 illustrates an example of an address mapping circuit AMC for use in the embodiment of FIG. 7.

FIG. 9 illustrates an example of memory controller MCON, containing the address mapping circuit AMC for converting the TAG addresses of the request address and of the write address at the time of writing back into addresses of DRAM accessing. The request address RQADR is converted by the AMC into an address DADR1 of DRAM accessing, and an address WBADR at the time of writing back is converted by the AMC into an address DADR2 of DRAM accessing. Further, a control signal from outside is communicated via the CTBUSA to a control circuit CTR1 within the MCON to generate a control signal for DRAM accessing, which is communicated to the DRAM via the CTBUSB.

Now will be explained address conversion by the AMC hereupon. First, D-TAG, D-INDEX and part of D-LINE are communicated to the MCON to be communicated to the AMC within the MCON. D-TAG and D-INDEX entered into the AMC are communicated to LC1 within the AMC. The LC1 consists of two exclusive OR circuits XOR1 and XOR2. A lower-order digit of D-INDEX is communicated to a node N1 of the LC1, that of D-TAG to a node N2 of the LC1, a higher-order digit of D-INDEX to a node N3 of the LC1, and that of D-TAG to a node N4 of the LC1. Within the LC1, N1 and N2 are entered into the exclusive OR circuit XOR2, and the result of operation is supplied to a node N5. Further, N3 and N4 are entered into the exclusive OR circuit XOR1, and the result of operation is supplied to a node N6. N5 is assigned to a lower-order digit of the bank address RBA, and N6, to a higher-order digit of the RBA. Further, a lower-order digit of D-INDEX is assigned to that of the row address RRA, and a higher-order digit of the row address RRA. Since here is considered a case in which four data transfers, 32 bits at a time, to the cache (cache fills)are accomplished, the 3 higher-order digits of D-LINE are converted into the column address RCA.

Next will be explained the conversion of the write address WBADR at the time of writing back. D-TAG of the WBADR and D-INDEX of the RQADR, communicated to the AMC, are communicated to an LC2. The LC2 consists of two exclusive OR circuits XOR3 and XOR4. Here again, a lower-order digit of D-INDEX is communicated to a node N7 of the LC2, that of D-TAG to a node N8 of the LC2, a higher-order digit of D-INDEX to a node N9 of the LC2, and that of D-TAG to a node N10 of the LC2. N7 and N8 are entered into the exclusive OR circuit XOR4, and the result of operation is supplied to a node N11. Further, N9 and N10 are entered into the exclusive OR circuit XOR3, and the result of operation is supplied to a node N12. N11 is assigned to a lower-order digit of the WBA, and N12, to a higher-order digit of the WBA. As the row address and the column address of the write address at the time writing back are respectively equal to INDEX and LINE of the request address, they are the same as the row address RRA and the column address RCA of the request address.

The addresses RBA, WBA, RRA and RCA of DRAM accessing obtained here are communicated to a timing controller TCR, and afterwards to the DRAM via the ADBUSB consisting of RBAL, WBAL and RCL. The timing of entering addresses to the DRAM is controlled by this TCR.

FIGS. 10A and 10B illustrate another possible configuration of the logic circuits LC1 and LC2 in the address mapping circuit AMC for converting the request address and the TAG address of the write address at the time of writing back into the address of DRAM accessing. Here is shown a case in which adders are used as LC1 and LC2, whose configurations and functions will be stated. The LC1 consists of one AND circuit AND1 and three exclusive OR circuits XOR1, XOR2 and XOR5. In the LC1, N1 and N2 are entered into an exclusive OR circuit XOR2, whose output is supplied to N5, N1 and N2 are entered into the AND circuit AND1, N3 and N4 are entered into the exclusive OR XOR1, and the outputs of the AND1 and the XOR1 are entered into the exclusive OR XOR5, whose result is supplied to N6. LC2 is configured in exactly the same way as LC1.

FIGS. 11A and 11B illustrate the result of bank address conversion by the AMC. In this diagram, the vertical axis represents D-TAG (in binary representation), the horizontal axis represents D-INDEX (in binary representation), and the numeral in each box is a bank address (in decimal notation). FIG. 11A shows the result of bank address conversion by the AMC whose logic circuits LC1 and LC2 are exclusive OR circuits as in FIG. 9, while FIG. 11B shows the result of bank address conversion by the AMC whose logic circuits LC1 and LC2 are adders as in FIGS. 10A and 10B. Irrespective of the type of the logic circuits used, as shown in (A) and (B), different numerals are assigned to all the bank address both in the horizontal axis and in the vertical axis. Thus, to generalize about necessary logic circuits for address conversion, they are circuits to receive some of INDEX bits and some of TAG bits and to supply bank address bits, which form the aforementioned bank address bits differing from each other when those INDEX bits are fixed in value and those TAG bits are varied in value, and also form mutually different bank address bits when those TAG bits are fixed in value and those INDEX bits are varied in value. Thus it is possible to assign accesses having a high level of spatial locality performed on the main memory to one bank and at the same time to assign read and write accesses at the time of writing back to a completely separate bank.

Figure 12A:
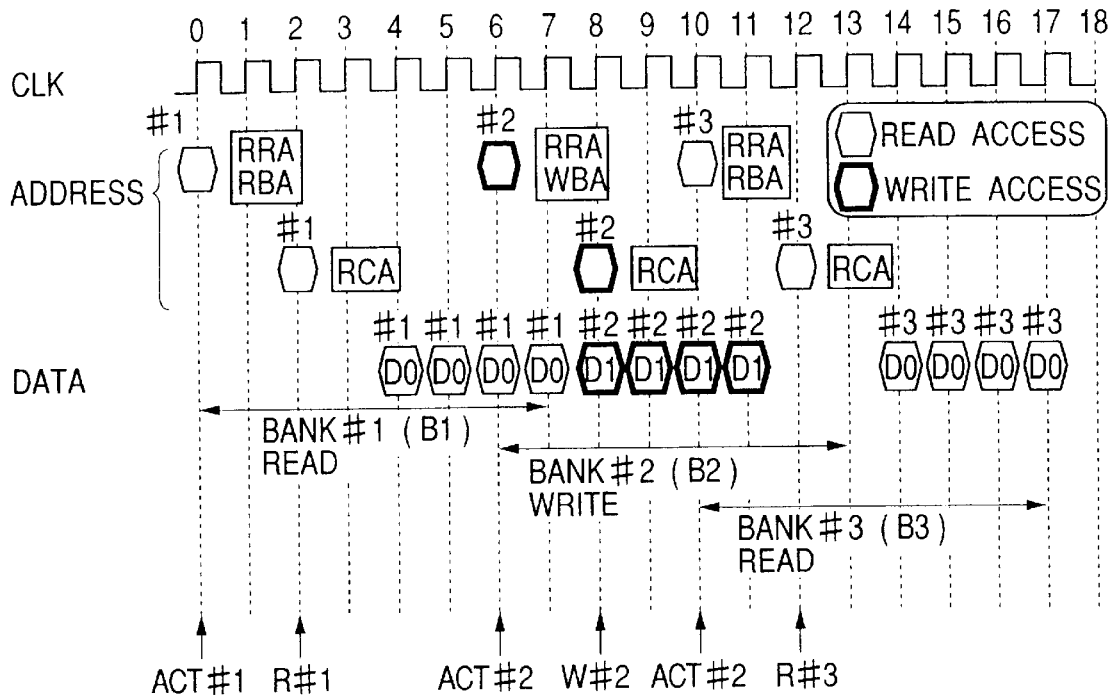
FIGS. 12A and 12B illustrate the access sequence of the embodiment shown in FIG. 7.
Figure 12B:
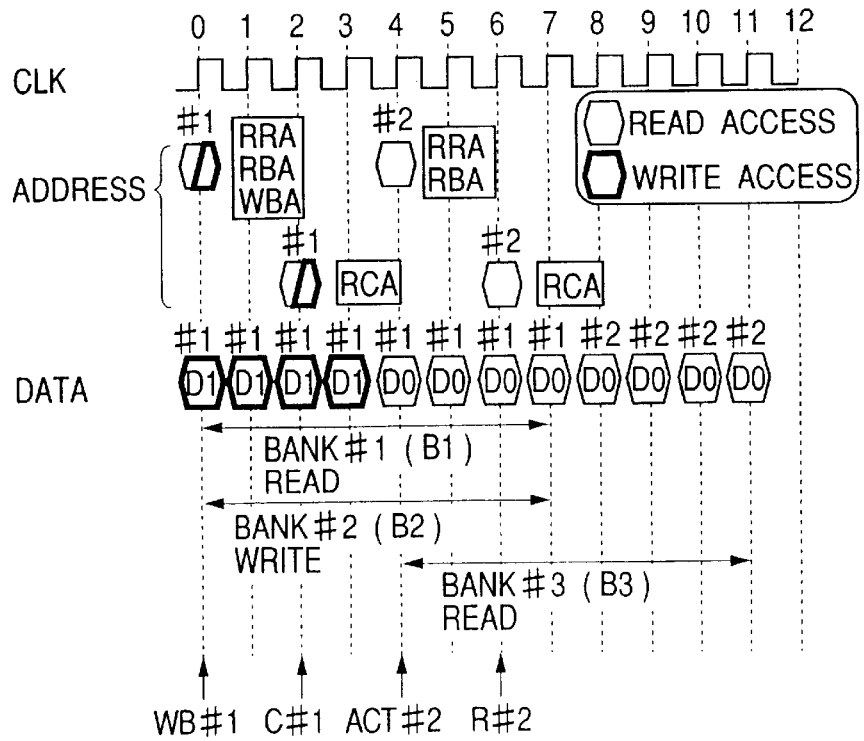

FIGS. 12A and 12B illustrate that an access protocol to be followed when reading out of the DRAM of FIGS. 8A and 8B is to be performed after writing back (writing back and reading). FIG. 12B shows an example of pseudo dual-port accessing operation according to the present invention. The pseudo dual-port accessing in this context means an access to a memory in which writing into one memory bank and reading out of another memory bank are accomplished in parallel on a time scale. FIG. 12A shows, for the sake of comparison, an instance in which writing back is accomplished without pseudo dual-port accessing. In both FIGS. 12A and 12B, the top row represents an operational clock for the DRAM, and the leading edges of the clock are assigned serial numbers. The next row represents addresses entered into the DRAM (Address),and the third row, the state of the use of the data bus between the CPU and the DRAM (Data). Here is shown a case in which a read access to the bank 1 of the DRAM takes place as a writing back operation, and a write access to the bank 2 takes place, followed by the occurrence of a read access to the bank 3. The bottom row shows the state of use of each bank. The numerals preceded by # denote the respective positions of access in the sequence.

First will be explained the accessing method of FIG. 12A. When a request for a read access to the DRAM arises, the word line of the bank on which the desired read data are stored is activated to cause the sense amplifier to amplify the data in the memory cell (bank activation). This is accomplished by communicating the bank address RBA and the row address RRA to the DRAM and, at the same time, entering a bank active command ACT#1. When the desired read data are amplified by the sense amplifier (bank-activated state), part of the data amplified by the sense amplifier are read out to the data bus by entering the column address RCA and a read command R#1 into the DRAM. For any subsequent writing, the bank is activated by entering the bank address WBA, the row address RRA and the bank active command ACT#2 for writing and, after the bank is activated, entering a write command W#2 and write data. It is supposed here that two clocks are taken until read and write commands are entered after the bank active command is entered, two clocks until the data are supplied after the read command is entered, and zero clock until the write data are entered after the write command is entered. The read access later occurring to the bank 3 is processed in the same way as the read access occurring to the bank 1. However, in order not to obstruct burst accessing to write data, the third bank active command ACT#3 is entered 10 clocks after the entry of the first bank active command ACT#1. Then, the read command R#3 is entered two clocks afterwards. Thus, in the case of FIG. 12A, 17 clocks are taken to complete the second outputting of the read data after the first bank active command is entered.

On the other hand, the accessing method according to the invention shown in FIG. 12B, upon occurrence of writing back, a read access to the bank 1 is started and at the same time a write access to the bank 2 is started. The commands and addresses sent by this accessing to the DRAM are a write-back command WB#1, the read bank address RBA, the write bank address WBA and the row address RRA. The use of the same row address RRA for reading and writing here utilizes the nature of the row address as part of INDEX and the relationship between read and write addresses at the time of writing back that the same INDEX is shared and TAG differs. At the same time, a write data transfer to the data bus is started. This is done, in view of the fact that read data are supplied 4 clocks after the entry of the bank active command, to enter the write data during the waiting time. Two clocks after the entry of the write-back command, a column command C#1 and the column address RCA are entered. This column address again is the same for both reading and writing. It is so because the column address consists of part of INDEX and part of LINE and the same LINE sharing the same INDEX and differing in TAG is replaced at the time of writing back. In this way, read and write accesses at the time of writing back can be accomplished simultaneously. At this time, as the write data are entered before the write bank is activated, these write data are temporarily received by the data pre-loading register DPLREG. These write data are transferred from the DPLREG according to the column command C#1 and the column address RCA to the pertinent bank after the write bank is activated. On the other hand, on the bank 2, the read data are outputted according to these C#1 and RCA. As reading and writing at the time of writing back can be processed on the bank 1 and the bank 2 in this way, the reading operation and the writing operation at the time of writing back can be completed in the same cycle. The read access occurring subsequently on the bank 3 is accomplished in the same procedure as read accessing of FIG. 12A. In this case, as the read access to the bank 3 can be started earlier than in FIG. 12A, only 11 cycles are taken until the read access to the bank 3 is completed from the time write-back occurs. This means higher speed than FIG. 12A by an equivalent of 6 cycles.

The pseudo dual-port accessing according to the present invention is characterized by the parallel accesses to two memory banks by a minimum addition of an address bus. Non-pseudo but real dual-port accessing means the use of two pairs of address buses and data buses. Thus, writing and reading in parallel, instead of in a time series, usually requires twice as many buses, but this entails an undesirable increase in hardware. The pseudo dual-port accessing hereunder, though require two of bank addresses alone to make possible parallel accessing, has the advantage of not requiring the addition of another set of address bus and data bus. Thus at the time of writing back, the positions differing only in bank address but the same in other respects, i.e. in row address and in column address, are accessed, so that there is no need to add any address bus except that for bank addresses.

Moreover, activating the DRAM bank and reading data out inevitably takes a certain length of time. This period of time is utilized by using the data bus in writing back on a time sharing bus, and the necessity for any additional data bus is thereby averted. Thus, at first write-back data from the cache are communicated via the data bus to the DRAM and accepted by the pre-loading register DPLREG of the DRAM. After that, data from another memory bank are communicated via the data bus to the cache. Therefore, in order to use the data bus on a time sharing basis, it needs only to provide the DRAM with a pre-loading register DPLREG so that write data can be accepted before the bank is activated to permit writing.

Incidentally, according to a protocol which permits the setting of a plurality of burst lengths, such as that of synchronous DRAM (SDRAM), the lengths of consecutive data (burst lengths) can be controlled. In such a system, if another read command is entered before data equivalent to the burst length are outputted, the previous burst transfer of data will be interrupted. Therefore, in writing back for the purpose of replacing the contents of the cache, because the required transfer data length is fixed, outputting of the next read data can be immediately started after the completion of the outputting of read data at the time of writing back by enabling the next read data to be entered without interrupting the burst transfer.

Embodiment 3

Figure 13:
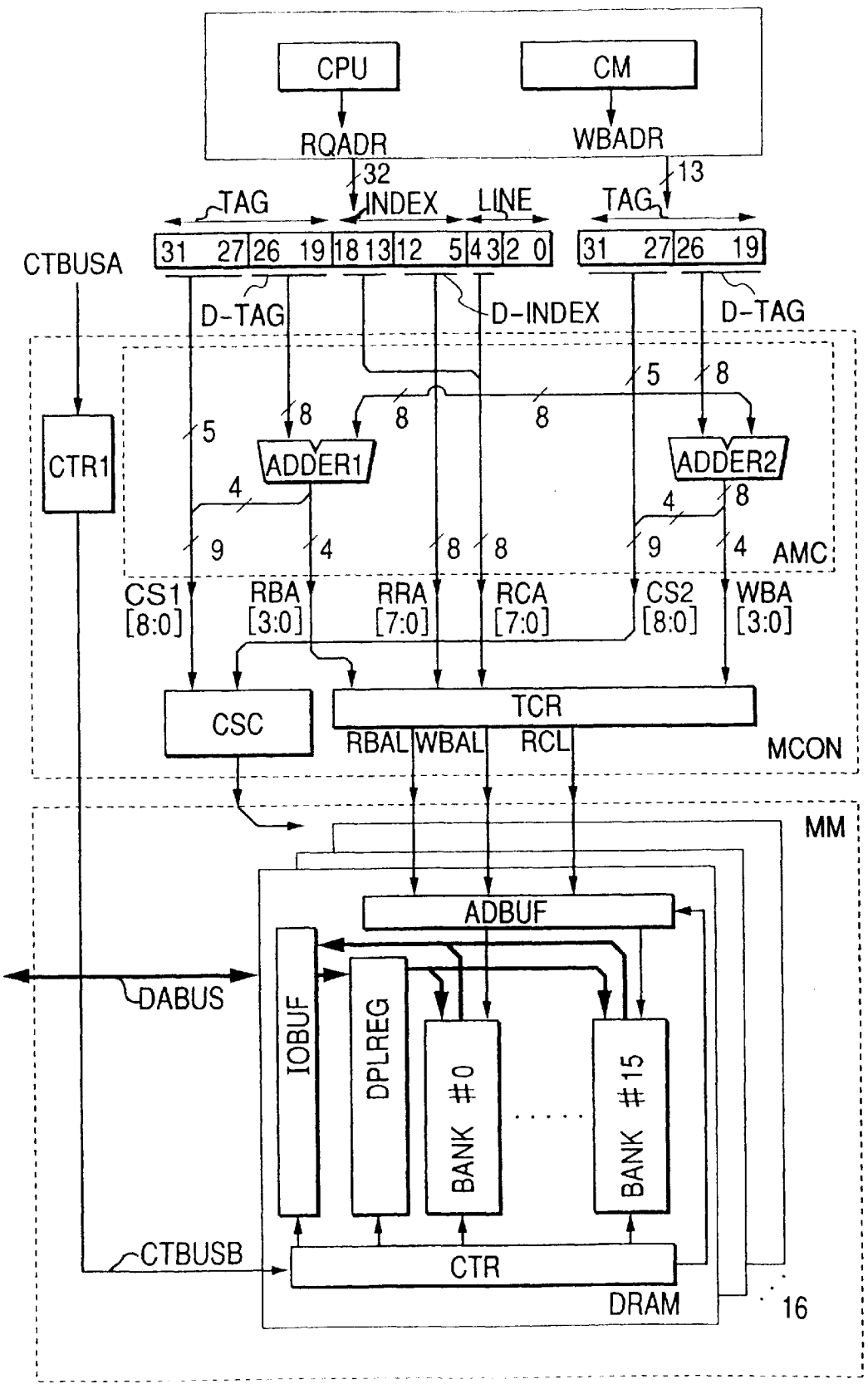
FIG. 13 illustrates another example of application of the information processing apparatus of FIG. 7.

FIG. 13 illustrates another example of application of the present invention to the information processing apparatus of FIG. 7 in a case where a cache having a typical capacity in current use and a DRAM are disposed. Here is supposed a direct-mapped type write-back system wherein the cache has a capacity of 512 KB and a block offset (LINE) of 32 B. In this case, LINE consists of 5 bits (0–4), INDEX, 14 bits (5–18), and the remainder, TAG (19–31). On the other hand, the total capacity of the main memory is supposed to be 128 MB, composed of a DRAM having a multi-bank configuration whose capacity is 8 MB. First, supposing that this 128 MB consists of a single chip DRAM, the earlier defined concept of D-TAG can be applied, so that D-TAG consists of 8 bits. This determines the number of independent banks required by this system to be 256. However, as the capacity of a single chip DRAM is 8 MB, far smaller than such a large required capacity, 16 chips are used to compose the main memory. As a result, this requirement can be met if the number of banks of each DRAM chip is 16, the number of word lines per bank is 256, and the number of memory cells under each word line is 16,384.

Hereupon, address conversion by the AMC within the memory controller MC will be explained. Here will be described a method to determine the reference numbers of banks and chips in a DRAM by addition. First will be explained conversion of the request address RQADR. The parts of the address to be added here are D-TAG (19–26) and D-INDEX (5–12). By entering these D-TAG and D-INDEX into an adder ADDER1, four lower-order digits and four higher-order digits of the resultant output are converted into the bank address RBA and a chip select CS1. Of these, the RBA is communicated to the timing controller TCR, and the CS, together with (27–31) of the RQADR, to a chip select circuit CSC. Further, by assigning D-INDEX for the row address RRA and (2–3) and (13–18) of the RQADR for the column address, address conversion for the DRAM is completed.

Next will be explained the conversion of the write address at the time of writing back. For the write address at the time of writing back, only TAG is communicated from the cache to the MCON, and this made the write address WBADR at the time of writing back. The parts of the address to be added here are the D-TAG (19–26) of WBADR and the D-INDEX of RQADR. By entering them into an adder ADDER2, four lower-order digits and four higher-order digits of the resultant output are converted into the bank address WBA and a chip select CS2. Of these, the CS2 is communicated to the CSC, and the WBA, to the TCR. Incidentally, as the row address and the column address of write accessing at the time of writing back correspond to the INDEX and LINE of the address, they are equal to RRA and RCA, respectively.

The timing controller TCR measures the timings at which RBA, WBA, RRA and RCA converted by the aforementioned AMC are issued to the DRAM. At the time of writing back, the TCR issues RBA, WBA and RRA at a first timing, and RCA at a second timing. Thus the pseudo dual-port memory according to the present invention for use at the time of writing back can be realized only by additionally installing write bank address lines and chip select signal lines for use at the time or writing back even where the main memory has too large a capacity to be accommodated by a single chip, and high speed processing of information is thereby made possible.

Incidentally, where fully simultaneous processing of read and write accesses at the time of writing back does not seem to be indispensable, the number of independent banks can be reduced to minimize the risk of bank conflicts. For this purpose, as in the case of FIG. 5, bank addresses can be subjected to operation by using part of D-TAG and D-INDEX.

Figure 14A:
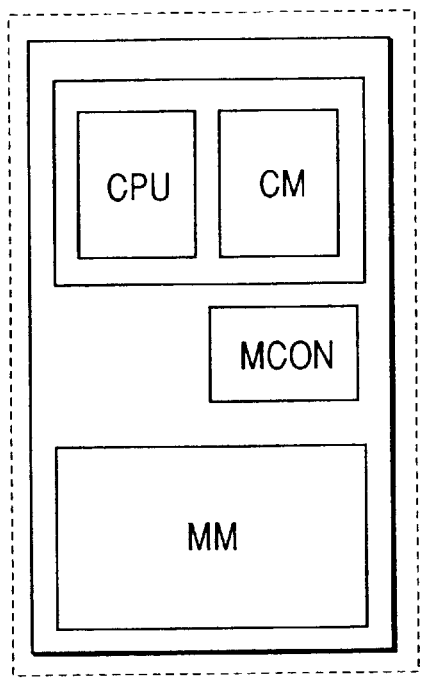
FIGS. 14A, 14B, 14C and 14D illustrate a specific method for realizing an information processing apparatus according to the invention.

Finally, realistic forms of the application of the information processing apparatus which has been described with reference to embodiments 1 to 3 will now be explained. FIG. 14(A) illustrates an embodiment in which a CPU, a cache CM, a memory controller MCON and a main memory MC are monolithically formed over the same semiconductor substrate.

Figure 14B:
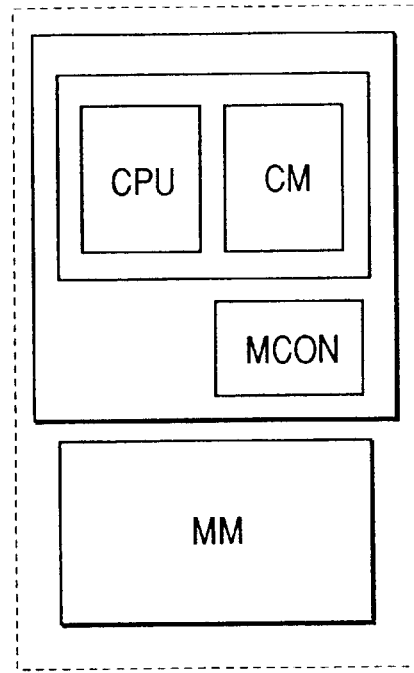
Figure 14C:
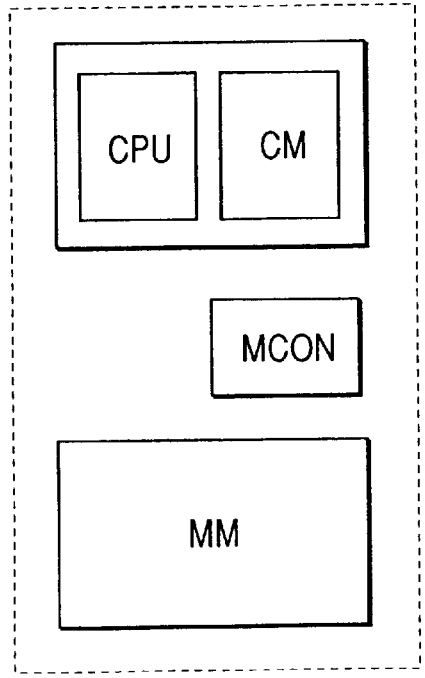
Figure 14D:
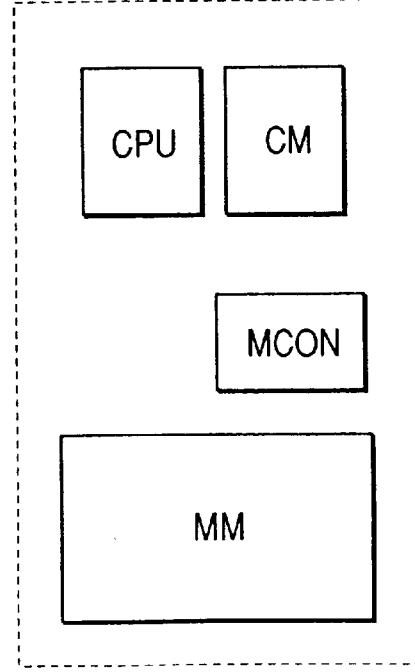

FIG. 14(B) illustrates an embodiment in which a CPU, a CM and an MCON are monolithically formed over a first semiconductor chip and an MM is formed over a second semiconductor chip. FIG. 14(C) illustrates an embodiment in which a CPU and a CM MCON are monolithically formed over the same semiconductor chip, an MCON is formed over a second semiconductor chip, and an MM is formed over a third semiconductor chip. FIG. 14(D) illustrates an embodiment in which a CPU is formed over a first semiconductor chip, a CM is formed over a second semiconductor chip, an MCON is monolithically formed over a third semiconductor chip, and an MM is formed over a fourth semiconductor chip.

In any of the embodiments illustrated in FIGS. 14(C) to (D), the address mapping circuit characterizing the present invention is realized by being mounted within the semiconductor chip of a memory controller MCON. Further, where a plurality of semiconductor chips constitute an embodiment as shown in FIGS. 14(B) to (D), each semiconductor chip is sealed in an IC package protected with resin or the like, and soldered onto a circuit board typically made of glass epoxy. Or else, such an embodiment may take the form of a multi-chip module in which a plurality of semiconductor chips are connected by bonding wires or solder bumps to a circuit board made of ceramic or the like.

Accesses to the main memory in a computer system having a cache include accesses whose INDEX varies, featuring what is known as the local character of referencing and accesses at the time of writing back of which INDEX remains the same and TAG varies. The present invention permits high speed accessing because it allows these different accesses to separate banks. Or, if read accesses and write accesses at the time or writing back can be assigned to completely separate banks, pseudo dual-port accessing will be made possible using only a single port, and write-back accessing and subsequent read accessing can be accomplished at high speed.

What is claimed is:

1. An information processing apparatus comprising:

a central processing unit;

an address mapping circuit receiving a first address and a write back address to form bank addresses and a row/column address;

a DRAM memory having a plurality of banks;

first and second address buses for transferring said bank addresses from said address mapping circuit to said DRAM memory; and a data bus for transferring read and write data;

wherein read operation to one of said banks and write back operation to another one of said banks has an overlapping period.

2. The information processing apparatus according to claim 1, wherein said address mapping circuit includes logic circuits;

wherein said first address is expressed by INDEX bits and TAG bits; and wherein said write back address is expressed by TAG bits.

3. The information processing apparatus according to claim 1, wherein read operation and write back operation is done to different banks having same row/column address.

4. The information processing apparatus according to claim 1, further comprising:

a timing controller to measure the timing for sending said addresses to said DRAM memory; and wherein the timing for sending said column address to said DRAM memory differs from the timing of sending said bank addresses to said DRAM memory.

5. The information processing apparatus according to claim 1, wherein said DRAM memory further has an input buffer coupled to said data bus, and a register coupled between said input buffer and said plurality of memory banks.

6. The information processing apparatus according to claim 1, wherein said data bus is used for transferring data from different memory banks.

7. An information processing apparatus comprising:

a central processing unit;

an address mapping circuit receiving a first address and a write back address to form bank addresses and a row/column address;

a DRAM memory having a plurality of banks;

first and second address buses for transferring said bank addresses from said address mapping circuit to said DRAM memory;

a data bus for transferring read and write data;

wherein said first address is expressed by INDEX bits and TAG bits; and wherein said write back address is expressed by TAG bits.

8. The information processing apparatus according to claim 7, wherein read operation to one of said banks and write back operation to another one of said banks has an overlapping period and are accessed to said row/column addresses.

9. The information processing apparatus according to claim 7, wherein said bank address for read operation is made by adding some of said INDEX bits and some of said TAG bits of said first address;

wherein said bank address for write back operation is made by adding some of said INDEX bits of said first address and some of said TAG bits of said write back address; and wherein said row/column address are made from some of said INDEX bits of said first address.

10. The information processing apparatus according to claim 7, further comprising:

a timing controller to measure the timing for sending said addresses to said DRAM memory;

wherein the timing for sending said column address to said DRAM memory differs from the timing of sending said bank addresses to said DRAM memory.

11. The information processing apparatus according to claim 8, wherein said DRAM memory further has an input buffer coupled to said data bus, and a register coupled between said input buffer and said plurality of memory banks.

12. The information processing apparatus, according to claim 7, wherein said data bus is used for transferring data from different memory banks.

13. The information processing apparatus, according to claim 2, wherein said address mapping circuit includes exclusive OR circuits.

14. An information processing apparatus comprising:

a central processing unit;

an address mapping circuit receiving a first address and a write back address to form bank addresses and a row/column address;

a DRAM memory having a plurality of banks;

first and second address lines for transferring said bank addresses from said address mapping circuit to said DRAM memory; and a data bus for transferring read and write data;

wherein read operation to one of said banks and write back operation to another one of said banks has an overlapping period.

15. The information processing apparatus according to claim 14, wherein said address mapping circuit includes logic circuits;

wherein said first address is expressed by INDEX bits and TAG bits; and wherein said write back address is expressed by TAG bits.

16. The information processing apparatus according to claim 14, wherein read operation and write back operation is done to different banks having same row/column address.

17. The information processing apparatus according to claim 14, further comprising:

a timing controller to measure the timing for sending said addresses to said DRAM memory; and wherein the timing for sending said column address to said DRAM memory differs from the timing of sending said bank addresses to said DRAM memory.

18. The information processing apparatus according to claim 14, wherein said DRAM memory further has an input buffer coupled to said data bus, and a register coupled between said input buffer and said plurality of memory banks.

19. The information processing apparatus according to claim 14, wherein said data bus is used for transferring data from different memory banks.

\* \* \* \* \*